Sept. 18, 1951     G. G. VAUGHAN     2,568,475
TOY PARA-ROCKET
Filed Sept. 20, 1946
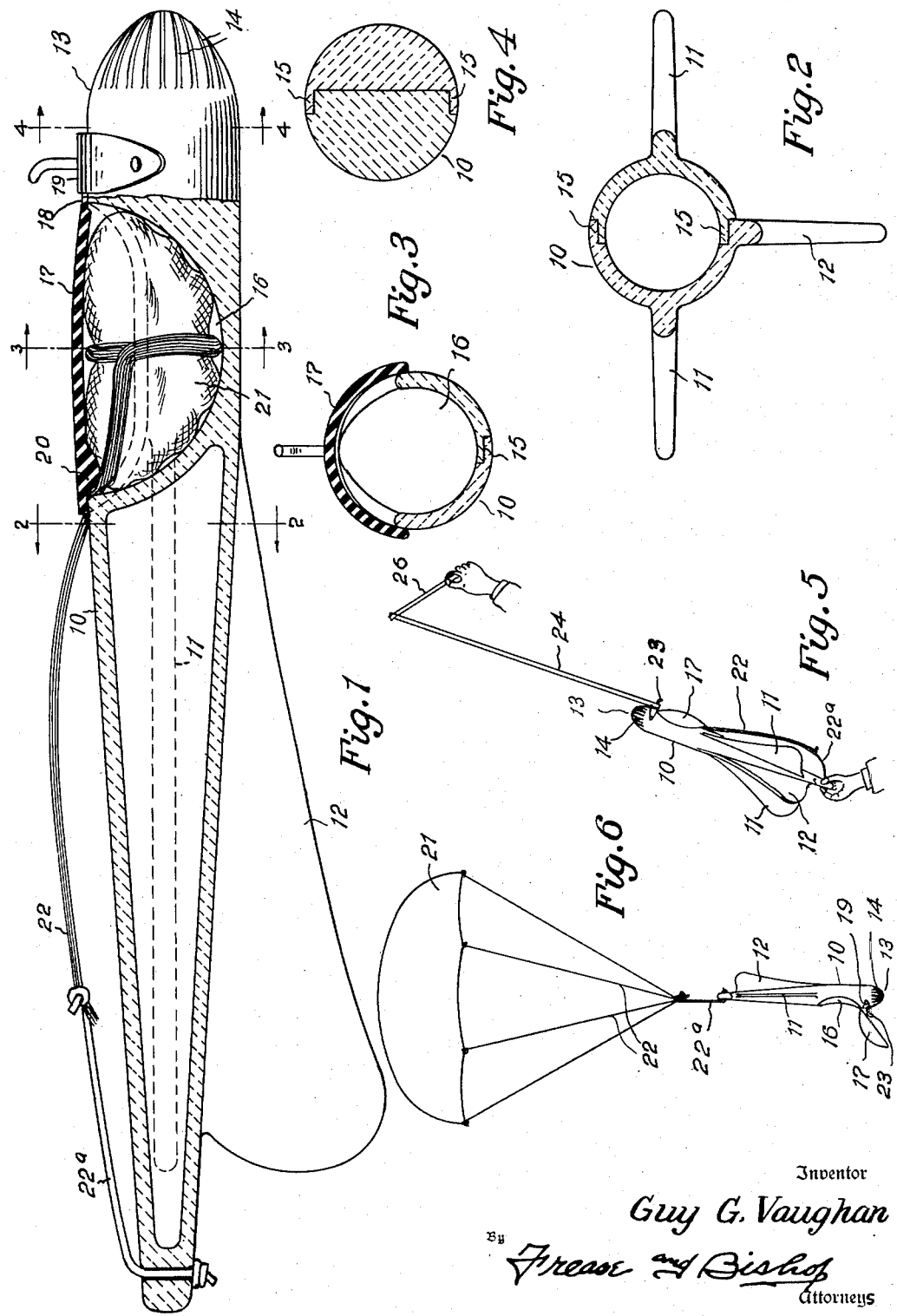
Inventor
Guy G. Vaughan
By Frease and Bishop
Attorneys Patented Sept. 18, 1951

2,568,475

UNITED STATES PATENT OFFICE 2,568,475

TOY PARA-ROCKET

Guy G. Vaughan, Norwalk, Ohio

Application September 20, 1946, Serial No. 698,296

2 Claims. (Cl. 46—86)

The invention relates to toys, and more particularly to a toy rocket adapted to be propelled into the air by a sling or the like and having a parachute connected thereto and located in a cavity in the body of the rocket and adapted to be automatically released when the rocket reaches the height of its movement and starts to descend.

The object of the invention is to provide a toy of this character comprising a rocket in the form of a fuselage and vanes formed of plastic or other suitable material, the shrouds of a small parachute being connected to the tail end of the rocket and a cavity being formed in the fuselage portion of the rocket to contain the parachute in folded position, a hinged door of rubber, plastic or the like normally enclosing the parachute within the cavity and arranged to automatically open to release the parachute when the rocket noses over to start its descent.

Another object is to provide a device of this character in which the hinged door is arranged to automatically open by gravity when the rocket noses down at the end of its upward flight.

A further object is to provide a hinged door of this character which is transversely curved to conform to the contour of the fuselage and the free end of the door being weighted by increased thickness so as to cause it to fall open when the rocket turns over in midair with the nose down.

A still further object is to provide a device of this character in which the nose of the rocket is grooved or fluted or provided with other means to produce a whistling or siren-like sound effect when the rocket is propelled through the air.

Another object of the invention is to provide a rocket of two molded sections cemented or otherwise attached together.

The above objects together with others which will be apparent from the drawing and following description, or which may be later referred to, may be attained by constructing the improved toy para-rocket in the manner hereinafter described in detail and illustrated in the accompanying drawing, in which;

Figure 1 is a inverted, vertical, longitudinal section through a toy para-rocket constructed in accordance with the invention showing the parachute folded and located within the cavity in the rocket and enclosed by the hinged door;

Fig. 2 is a transverse, sectional view through the intermediate portion of the fuselage, taken on the line 2—2, Fig. 1;

Fig. 3 is a transverse, sectional view through the cavity of the fuselage and the hinged door, taken on the line 3—3, Fig. 1;

Fig. 4 is a transverse, sectional view through the nose portion of the fuselage, taken on the line 4—4, Fig. 1;

Fig. 5 is a small perspective view showing the manner in which the rocket is propelled into the air by means of a sling or the like; and Fig. 6 is a small perspective view showing the rocket descending, suspended from the parachute.

The rocket comprises generally a tapered fuselage portion 10 having the horizontal vanes 11 on opposite sides thereof and a depending vertical vane 12 on its under side.

This fuselage is of generally cigar shape and the nose 13 thereof is preferably provided with a plurality of grooves or flutes 14 so as to produce a whistling or siren-like sound when the rocket is propelled through the air, or any other conventional type of siren may be located in the nose of the rocket for producing this sound effect.

The rocket may be formed of plastic or other suitable material and is preferably molded in two sections as best shown in Figs. 2, 3 and 4, the sections being overlapped at their meeting edges as indicated at 15 and cemented or otherwise permanently attached together to form the complete rocket.

A cavity 16 is formed near the nose end of the fuselage, upon the under side thereof, and is arranged to be normally closed by a hinged door 17 of rubber, plastic or the like, preferably curved to conform to the contour of the fuselage and having the reduced forward end 18 clamped beneath the metal plate 19 and forming a flexible hinge for the door, the rear end of the door being of increased thickness, as indicated at 20, to form a weighted end in order to cause the door to open by gravity when the rocket is inverted.

A small parachute is indicated generally at 21, formed of nylon or similar material, and is connected to the tail end of the fuselage by the shrouds 22, which are preferably in the form of resilient rubber cords so as to absorb shock when the rocket starts its descent and the parachute opens, a single rubber band 22a being preferably located between the ends of the shrouds and the tail end of the rocket.

As shown in Fig. 1 the parachute 21 is normally folded and contained within the cavity 16 of the fuselage, the door 17 enclosing the same.

In order to propel the rocket through the air, a hook 23 is fixed upon the nose end of the fuselage, preferably being mounted upon the curved metal plate 19. Any suitable sling, such as the rubber band 24 shown in Fig. 5, attached at one end to the stick 26, may be provided for propelling the rocket into the air.

The stick 26 is held in one hand as shown in said Figure 5, the other end of the rubber band 24 being looped over the hook 23 and the tapered or flattened tail end of the rocket grasped in the other hand to propel the rocket by stretching the rubber band to the desired tension and then releasing the grasp of the hand upon the rocket.

When the rocket reaches the height of its flight, it will nose down, swinging to vertical position in midair, and the weighted free end of the hinged door 17 will cause the door to immediately open by gravity, as shown in Fig. 6, releasing the parachute 21 from the cavity 16 in the fuselage and permitting the parachute to open as the rocket descends whereby the rocket will float to earth.

I claim:

1. A toy of the character described including a rocket adapted to be propelled into the air and comprising a rearwardly tapered, cigar-shaped fuselage, the forward larger end of which is solid and the remainder of which is hollow, so as to cause the rocket to descend with its forward end down, there being a half-round cavity in one side of the fuselage near its larger end, a flexible rubber door of semi-circular cross-sectional shape normally covering said cavity, said rubber door having a reduced forward end connected to the fuselage and providing a flexible hinge, the rear end of the rubber door being of increased thickness to provide a weight to cause the door to be opened by gravity when the rocket is inverted, and a parachute having shrouds connected to the rear end of the fuselage, said parachute being normally folded and contained in said cavity and adapted to be released when the door opens.

2. A toy of the character described including a rocket adapted to be propelled into the air and comprising a rearwardly tapered, cigar-shaped fuselage, the forward larger end of which is solid and the remainder of which is hollow so as to cause the rocket to descend with its forward end down, said fuselage being formed of two similar longitudinal halves having their meeting edges overlapped and permanently attached together, there being a half-round cavity in one side of the fuselage near its larger end, a flexible rubber door of semi-circular cross-sectional shape normally covering said cavity, said rubber door having a reduced forward end providing a flexible hinge, a half-round plate connected to the fuselage formed of said cavity and clamping said flexible hinge thereto, the rear end of the rubber door being of increased thickness to provide a weight to cause the door to be opened by gravity when the rocket is inverted, and a parachute having shrouds connected to the rear end of the fuselage, said parachute being normally folded and contained in said cavity and adapted to be released when the door opens.

GUY G. VAUGHAN.

REFERENCES CITED

The following references are of record in the file of this patent:

UNITED STATES PATENTS

| Number | Name | Date |
|---|---|---|
| 1,340,259 | Taylor | May 18, 1920 |
| 1,515,314 | Petersen | Nov. 11, 1924 |
| 1,938,931 | Newman | Dec. 12, 1933 |
| 2,060,213 | Hippen et al. | Nov. 10, 1936 |
| 2,149,845 | Holcomb | Mar. 7, 1939 |

FOREIGN PATENTS

| Number | Country | Date |
|---|---|---|
| 295,713 | Italy | Apr. 28, 1932 |
| 313,700 | Italy | Jan. 3, 1934 |
| 363,444 | Italy | Oct. 5, 1938 |
| 816,262 | France | Aug. 4, 1937 |